(12) United States Patent
Fujiwara

(10) Patent No.: US 11,802,742 B2
(45) Date of Patent: Oct. 31, 2023

(54) HEAT EXCHANGER

(71) Applicant: Sumitomo Precision Products Co., Ltd., Amagasaki (JP)

(72) Inventor: Kota Fujiwara, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 273 days.

(21) Appl. No.: 17/277,814

(22) PCT Filed: Sep. 19, 2019

(86) PCT No.: PCT/JP2019/036678
§ 371 (c)(1),
(2) Date: Mar. 19, 2021

(87) PCT Pub. No.: WO2020/059774
PCT Pub. Date: Mar. 26, 2020

(65) Prior Publication Data
US 2021/0348856 A1 Nov. 11, 2021

(30) Foreign Application Priority Data
Sep. 21, 2018 (JP) .................. 2018-177447

(51) Int. Cl.
*F28F 7/02* (2006.01)
*F28F 13/08* (2006.01)

(52) U.S. Cl.
CPC ............... *F28F 7/02* (2013.01); *F28F 13/08* (2013.01)

(58) Field of Classification Search
CPC ................... F28F 7/02; F28F 13/08

USPC ......................................... 165/159
See application file for complete search history.

(56) References Cited

U.S. PATENT DOCUMENTS

| | | | |
|---|---|---|---|
| 7,866,377 B2* | 1/2011 | Slaughter | F28F 13/00 700/120 |
| 9,541,331 B2* | 1/2017 | Nagurny | F28F 9/18 |
| 10,107,555 B1* | 10/2018 | Miller | B23P 15/26 |
| 10,684,080 B2* | 6/2020 | Moore | F28D 7/08 |

(Continued)

FOREIGN PATENT DOCUMENTS

| | | |
|---|---|---|
| EP | 0 015 915 B1 | 9/1982 |
| JP | 2001-27157 A | 1/2001 |

(Continued)

OTHER PUBLICATIONS

International Search Report (PCT/ISA/210) issued in PCT Application No. PCT/JP2019/036678 dated Nov. 5, 2019 with English translation (four (4) pages).

(Continued)

*Primary Examiner* — Justin M Jonaitis
(74) *Attorney, Agent, or Firm* — Crowell & Moring LLP

(57) ABSTRACT

A heat exchanger (100) includes a plurality of flow paths (10) each having a tubular shape, the plurality of flow paths including a plurality of first flow paths (11) configured to allow a first fluid (3) to flow therethrough and a plurality of second flow paths (12) configured to allow a second fluid (4) to flow therethrough. The plurality of flow paths extend in a predetermined direction as a whole. A position and an outer shape of each of the plurality of flow paths in a cross-section (CS) orthogonal to the predetermined direction vary according to a position of the each of the plurality of flow paths in the predetermined direction.

8 Claims, 8 Drawing Sheets

(56) References Cited

U.S. PATENT DOCUMENTS

| | | | |
|---|---|---|---|
| 11,209,222 B1* | 12/2021 | Colson | B33Y 80/00 |
| 11,421,938 B2* | 8/2022 | Krieger | F28F 9/0131 |
| 11,506,459 B2* | 11/2022 | Yoshida | F28F 13/12 |
| 2008/0135219 A1* | 6/2008 | Doh | F28D 7/082 |
| | | | 165/156 |
| 2010/0122806 A1 | 5/2010 | Halgash | |
| 2011/0108253 A1 | 5/2011 | Cool | |
| 2016/0116222 A1* | 4/2016 | Shedd | F28F 1/36 |
| | | | 165/166 |
| 2017/0205146 A1* | 7/2017 | Turney | F28D 7/0033 |
| 2017/0292791 A1* | 10/2017 | Zaffetti | F28D 7/0033 |
| 2017/0367218 A1* | 12/2017 | Gerstler | F28D 9/0093 |
| 2018/0187984 A1* | 7/2018 | Manzo | F28F 13/12 |
| 2018/0238627 A1 | 8/2018 | Herring et al. | |
| 2020/0166293 A1* | 5/2020 | Turney | F28F 7/02 |
| 2020/0326141 A1* | 10/2020 | Wang | F28F 13/18 |
| 2022/0341683 A1* | 10/2022 | Fujiwara | F28F 7/02 |

FOREIGN PATENT DOCUMENTS

| | | |
|---|---|---|
| JP | 5700890 B1 | 4/2015 |
| SE | 1651723 A1 | 7/2018 |

OTHER PUBLICATIONS

Japanese-language Written Opinion (PCT/ISA/237) issued in PCT Application No. PCT/JP2019/036678 dated Nov. 5, 2019 (six (6) pages).

\* cited by examiner

HEAT EXCHANGER

TECHNICAL FIELD

The present invention relates to a heat exchanger, and more particularly, it relates to a heat exchanger that performs heat exchange between fluids flowing through flow paths.

BACKGROUND ART

Conventionally, a heat exchanger that performs heat exchange between fluids flowing through flow paths is known. Such a heat exchanger is disclosed in Japanese Patent No. 5700890, for example.

There are various types of heat exchangers, and Japanese Patent No. 5700890 discloses a plate-fin heat exchanger and a shell and tube heat exchanger. These heat exchangers are manufactured by integrating components in an assembled state by brazing, for example.

PRIOR ART

Patent Document

Patent Document 1: Japanese Patent No. 5700890

SUMMARY OF THE INVENTION

Problems to be Solved by the Invention

In recent years, improvements in manufacturing technology represented by an additive manufacturing method, for example, have progressed, and it is becoming possible to achieve a heat exchanger having a novel structure different from the conventional one. From such a background, there is a demand for a heat exchanger having a novel structure that has never existed before and capable of improving the heat exchange efficiency.

The present invention has been proposed in order to solve the aforementioned problems, and one object of the present invention is to provide a heat exchanger having a novel structure and capable of improving the heat exchange efficiency.

Means for Solving the Problems

In order to attain the aforementioned object, a heat exchanger according to the present invention includes a plurality of flow paths each having a tubular shape, the plurality of flow paths including a plurality of first flow paths configured to allow a first fluid to flow therethrough and a plurality of second flow paths configured to allow a second fluid that exchanges heat with the first fluid to flow therethrough. The plurality of flow paths extend in a predetermined direction as a whole, and a position and an outer shape of each of the plurality of flow paths in a cross-section orthogonal to the predetermined direction vary according to a position of the each of the plurality of flow paths in the predetermined direction. The expression "the plurality of flow paths extend in a predetermined direction as a whole" indicates that the plurality of flow paths all extend from inlets of the flow paths to outlets of the flow paths arranged in the predetermined direction, but in the process from the inlets toward the outlets, the plurality of flow paths are allowed to bend in a direction different from the predetermined direction. The expression "outer shape in a cross-section" refers to the shape of the contour of the tubular flow path in the relevant cross-section.

In the heat exchanger according to the present invention, with the above configuration, the position and outer shape of each of the flow paths in the cross-section orthogonal to the predetermined direction vary according to a position of the flow path in the predetermined direction, and thus an action of fluctuating and agitating the flow of the first fluid and the second fluid that flow through the flow paths can be obtained. By agitating, a temperature boundary layer formed when the first fluid and the second fluid flow through the flow paths can be destroyed to improve the heat exchange efficiency. Furthermore, in a common heat exchanger, the positions and outer shapes of flow paths in a cross-section are often maintained constant, and in order to fluctuate the fluid flow, structures that become obstacles are often provided inside the flow paths. In this case, an increase in the pressure loss of the flow paths tends to be large due to the influence of the obstacles, whereas with the above configuration, the positions and outer shapes of the entire flow paths in the cross-section can be varied. Thus, an action of fluctuating and agitating the flow can be obtained without providing obstacles in the flow paths, and an increase in pressure loss can be significantly reduced or prevented. When obstacles are provided in the flow paths, further improvement in heat exchange efficiency can be expected due to the synergistic effect of the variations in the positions and outer shapes of the flow paths in the cross-section and the obstacles although the pressure loss increases. From the above, it is possible to provide the heat exchanger having a novel structure and capable of improving the heat exchange efficiency.

In the aforementioned heat exchanger according to the present invention, the plurality of flow paths are preferably arranged in a grid pattern in a direction orthogonal to the predetermined direction such that each of the plurality of first flow paths and each of the plurality of second flow paths are alternately arranged, and the position and the outer shape of the each of the plurality of flow paths preferably vary while a state in which the each of the plurality of first flow paths and the each of the plurality of second flow paths are adjacent to each other via a partition wall is maintained. Accordingly, the flow paths can be arranged such that the plurality of second flow paths surround a first flow path, and the plurality of first flow paths surround a second flow path. Therefore, the inner peripheral surfaces of the tubular flow paths (the inner peripheral surfaces of the partition wall) can serve as primary heat transfer surfaces over the entire circumferences. Even when the positions and outer shapes of the flow paths in the cross-section are varied, heat exchange between the first fluid and the second fluid can be performed via the primary heat transfer surfaces defined by the partition wall of the flow paths. Therefore, the heat exchange efficiency can be further improved as compared with a case in which a secondary heat transfer surface such as a corrugated fin is provided.

In the aforementioned heat exchanger according to the present invention, the position and the outer shape of the each of the plurality of flow paths preferably vary due to variations in a position and an orientation of a partition wall configured to separate the plurality of flow paths in the cross-section. Accordingly, the positions and outer shapes of the flow paths can be easily varied by simply varying the position and orientation of the partition wall without increasing or decreasing the number of partition walls or providing structures on the partition wall.

In the aforementioned heat exchanger according to the present invention, the each of the plurality of flow paths preferably has a first shape in the cross-section that passes through a first position in the predetermined direction, the outer shape of the each of the plurality of flow paths preferably changes to a second shape that partially overlaps the first shape as viewed in the predetermined direction in the cross-section that passes through a second position in the predetermined direction, and the outer shape of the each of the plurality of flow paths preferably changes to a third shape that partially overlaps the second shape and does not overlap the first shape as viewed in the predetermined direction in the cross-section that passes through a third position in the predetermined direction. Accordingly, the outer shape of the flow path changes from the first shape to the third shape via the second shape according to the position thereof in the predetermined direction such that the position of the flow path changes to a position completely deviated as viewed in the predetermined direction. In other words, the position of the flow path changes by one or more flow paths between the first shape and the third shape. Thus, the first fluid and the second fluid that flow through the flow paths can be moved greatly in the direction orthogonal to the predetermined direction and effectively agitated, and thus the heat exchange efficiency can be more effectively improved.

The aforementioned heat exchanger according to the present invention, the position and the outer shape of the each of the plurality of flow paths in the cross-section preferably periodically vary such that the position of the each of the plurality of flow paths in the cross-section varies according to the position of the each of the plurality of flow paths in the predetermined direction between a first end to a second end of the each of the plurality of flow paths, and then the each of the plurality of flow paths returns to an original position thereof. Accordingly, at the outlets of the flow paths, the flow paths can return to the same positions as their original positions at the inlets of the flow paths after the positions of the flow paths in the cross-section vary from the inlets toward the outlets, for example. In this case, the inlets and outlets of the flow paths are arranged in the same manner as viewed in the predetermined direction, and thus the design of the heat exchanger can be facilitated. When the periodic variation is repeated a plurality of times, the flow paths only need to repeat a shape variation for one cycle, and thus the design of the heat exchanger can be facilitated.

In this case, the position of the each of the plurality of flow paths in the cross-section preferably changes spirally between the first end to the second end of the each of the plurality of flow paths. Accordingly, it is possible to impart, to the flow of the first fluid and the second fluid in the flow paths, a motion component to rotate (turn) the flow of the first fluid and the second fluid in the cross-section by the spiral positional change, and thus the first fluid and the second fluid can be effectively agitated. Furthermore, the positions of the flow paths can be spirally changed regularly, and thus the design of the heat exchanger can be facilitated.

In the aforementioned heat exchanger according to the present invention, the plurality of flow paths preferably form a plurality of unit structures including the plurality of first flow paths and the plurality of second flow paths, and positions and outer shapes of the plurality of first flow paths and the plurality of second flow paths included in each of the plurality of unit structures preferably vary in conjunction with variations in a position and an orientation of a partition wall between the plurality of flow paths in each of the plurality of unit structures. Accordingly, the positions and outer shapes of the flow paths can be varied while the heat transfer surfaces defined by the partition wall between the first flow paths and the second flow paths in the unit structure are maintained. Therefore, even when the positions and outer shapes of the flow paths are varied while the first fluid and the second fluid are agitated by variations in the positions and outer shapes of the flow paths, the heat transfer surfaces between the first flow paths and the second flow paths can be secured.

In the aforementioned heat exchanger according to the present invention, the position of the each of the plurality of flow paths in the cross-section preferably varies between a first end to a second end of the each of the plurality of flow paths in the predetermined direction such that an adjacent flow path is switched to another flow path. Accordingly, for example, at the inlet positions of the flow paths, the first flow path is adjacent to the predetermined second flow paths, and in the process toward the outlets of the flow paths, the same first flow path is adjacent to other second flow paths. Thus, heat exchange can be performed between more flow paths, and thus generation of a difference in temperature distribution for each flow path due to drift or the like can be significantly reduced or prevented.

In this case, the adjacent flow path is preferably switched between the first end to the second end of the each of the plurality of flow paths in the predetermined direction such that each of the plurality of first flow paths is adjacent to more different second flow paths than can be concurrently adjacent in any of cross-sections orthogonal to the predetermined direction. Accordingly, the adjacent flow path is switched such that the first flow path can be adjacent to more second flow paths than the number of adjacent second flow paths at the inlets of the flow paths, for example, so as to exchange heat with each second flow path. Thus, a difference in temperature distribution for each flow path can be effectively significantly reduced or prevented.

Effect of the Invention

According to the present invention, as described above, it is possible to provide the heat exchanger having a novel structure and capable of improving the heat exchange efficiency.

MODES FOR CARRYING OUT THE INVENTION

An embodiment of the present invention is hereinafter described on the basis of the drawings.

A heat exchanger 100 according to the embodiment is now described with reference to FIGS. 1 to 10.
(Overall Configuration of Heat Exchanger)

Figure 1:
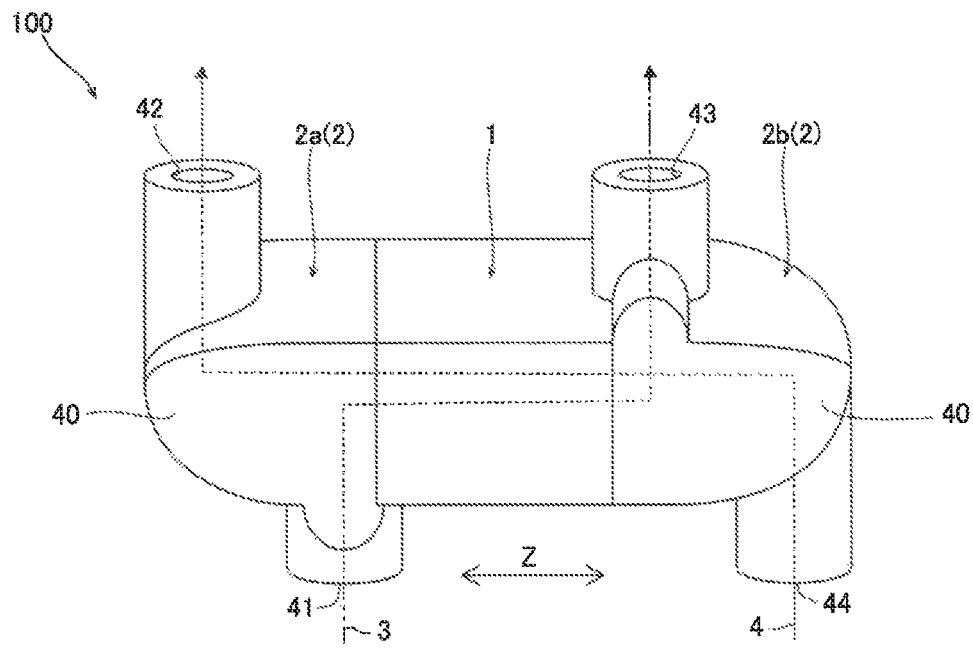
FIG. 1 A perspective view schematically showing a heat exchanger according to a first embodiment.

As shown in FIG. 1, the heat exchanger 100 includes a core 1 and headers 2.

In an example shown in FIG. 1, the core 1 has a cylindrical shape with both ends open, having a rectangular cross-section, and is configured to allow fluids to flow between a first end to a second end of the core 1. In the core 1, at least a first fluid 3 and a second fluid 4 flow through separate flow paths, and heat is exchanged between the first fluid 3 and the second fluid 4 in the process in which the first fluid 3 and the second fluid 4 flow through the core 1.

The headers 2 are connected to both ends of the core 1, respectively. The headers 2 are configured such that the fluids can be introduced into the core 1 or the fluids can be discharged from the core 1.

Each of the headers 2 is provided with two openings for introducing and discharging the fluids. In the example of FIG.

1, a first header 2a includes an inlet 41 for the first fluid 3 and an outlet 42 for the second fluid 4. A second header 2b includes an outlet 43 for the first fluid 3 and an inlet 44 for the second fluid 4.

Figure 2:
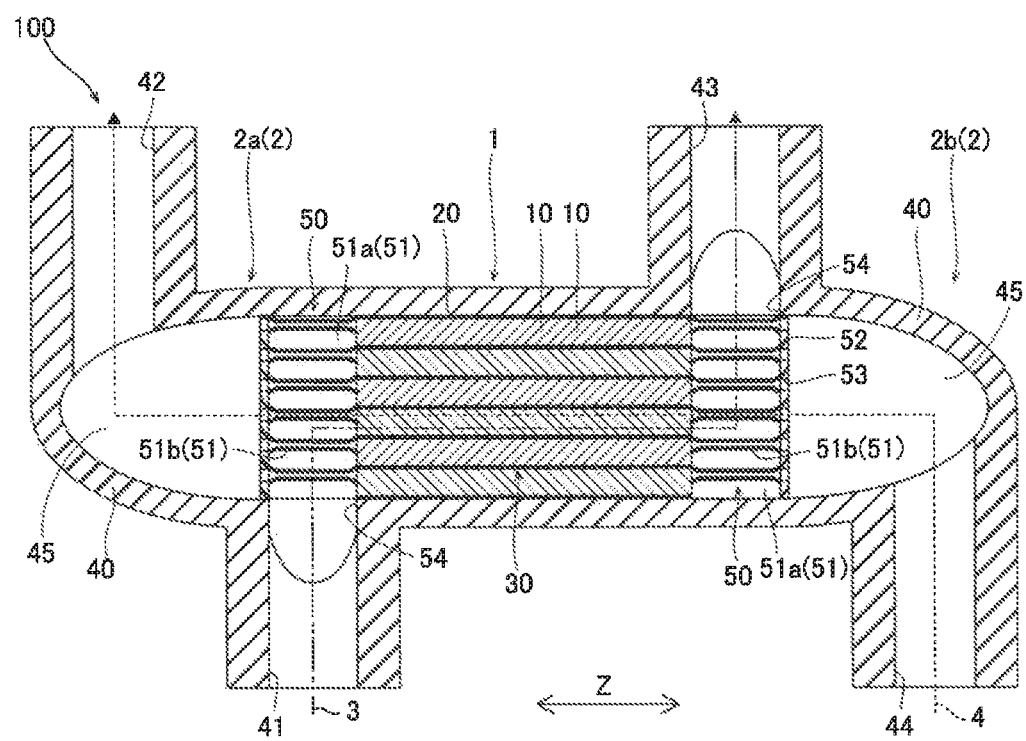
FIG. 2 A schematic sectional view for illustrating the schematic structure of the heat exchanger shown in FIG. 1.

As shown in FIG. 2, each of the headers 2 includes a dome-shaped cover 40 in which the aforementioned inlet and outlet are formed. The cover 40 is provided so as to cover the first end or the second end of the core 1. The headers 2 include distributors 50 that communicate first flow paths 11 (see FIG. 3) of the core 1 with the inlet 41 or the outlet 43 for the first fluid 3, and communicate second flow paths 12 (see FIG. 3) of the core 1 with the inlet 44 or the outlet 42 for the second fluid 4. The distributors 50 are arranged inside the covers 40, and flow the first fluid 3 and the second fluid 4 through separately partitioned routes.

The first header 2a supplies the first fluid 3 flowing in through the inlet 41 to the first flow paths 11 of the core 1 via the distributor 50, and the second header 2b sends the first fluid 3 flowing out of the first flow paths 11 of the core 1 to the outlet 43 via the distributor 50.

The second header 2b supplies the second fluid 4 flowing in through the inlet 44 to the second flow paths 12 of the core 1 via the distributor 50, and the first header 2a sends the second fluid 4 flowing out of the second flow paths 12 of the core 1 to the outlet 42 via the distributor 50.

Thus, the heat exchanger 100 according to this embodiment is a counter-flow heat exchanger in which the first fluid 3 flows from the first end to the second end of the core 1, and the second fluid 4 flows from the second end to the first end of the core 1 such that heat is exchanged.

The term "counter-flow" refers to the manner in which fluids that exchange heat flow in opposite directions. In the counter-flow heat exchanger 100, heat is exchanged between the inlet side of the first fluid 3 and the outlet side of the second fluid 4, and heat is exchanged between the first fluid 3 on the outlet side and the second fluid 4 on the inlet side, and thus the outlet temperature of the first fluid 3 can be brought closer to the inlet temperature of the second fluid 4, and the outlet temperature of the second fluid 4 can be brought closer to the inlet temperature of the first fluid 3. Therefore, a temperature difference between the inlet temperature and the outlet temperature of each fluid can be large, and high heat exchange efficiency can be obtained.
(Structure of Core)

The specific structure of the core 1 is now described with reference to FIGS. 3 to 8. The core 1 includes a plurality of tubular flow paths 10. The plurality of flow paths 10 include a plurality of first flow paths 11 through which the first fluid 3 flows and a plurality of second flow paths 12 through which the second fluid 4, which exchanges heat with the first fluid 3, flows. That is, the flow paths 10 through which the first fluid 3 flows are the first flow paths 11, and the flow paths 10 through which the second fluid 4 flows are the second flow paths 12.

Figure 3:
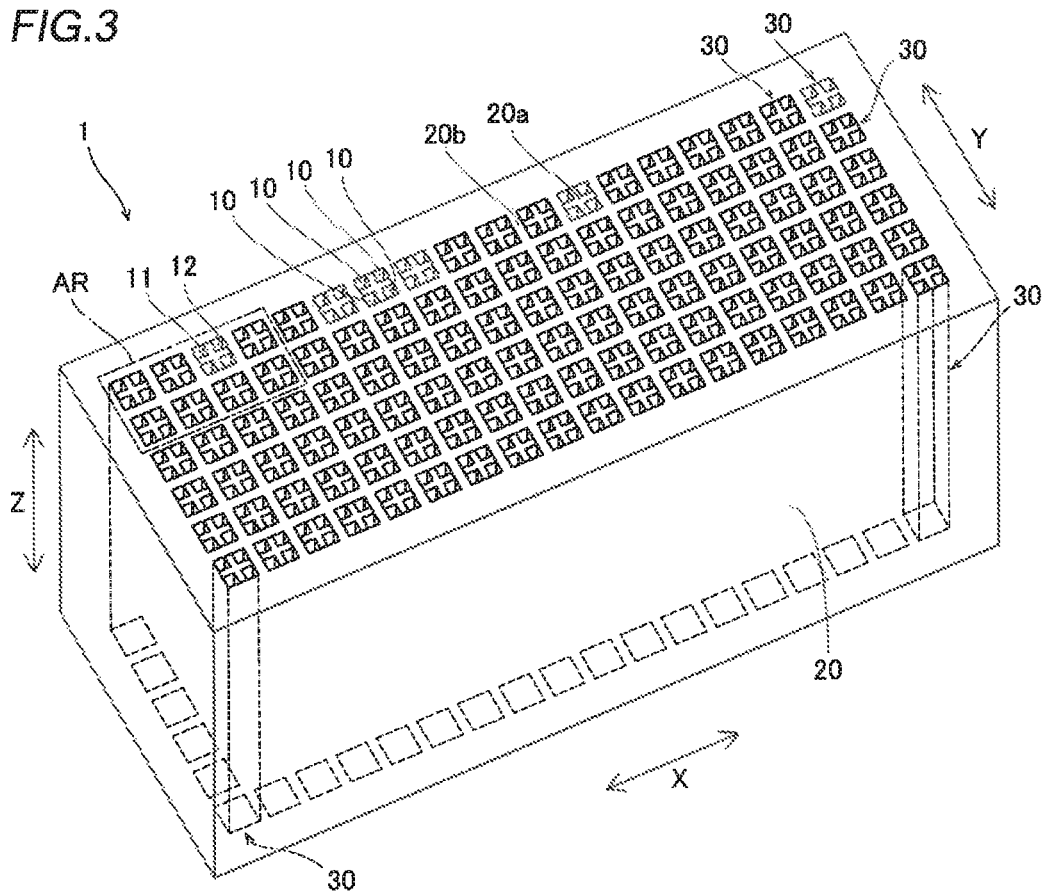
FIG. 3 A perspective view schematically showing a core of the heat exchanger.

The core 1 shown in FIG. 3 has a rectangular parallelepiped shape and includes the plurality of tubular flow paths 10 provided between the first end to the second end. The flow paths 10 pass through the core 1 from the first end to the second end, and include, at both ends, openings that serve as an inlet and an outlet for the fluids. In this embodiment, the flow paths 10 are pipe lines each having one inlet and one outlet. That is, the flow paths 10 do not branch or merge midway. Each flow path 10 is separated by partition walls 20.

The plurality of flow paths 10 extend in a predetermined direction as a whole. In FIG. 3, the predetermined direction is a direction in which the first end and the second end of the core 1 are connected. In the following description, for convenience, the predetermined direction is defined as a Z direction, and two directions orthogonal to each other in a plane orthogonal to the Z direction are defined as an X direction and a Y direction, respectively. In FIG. 3, the X direction and the Y direction are taken along the sides of the rectangular parallelepiped core 1. Therefore, in the following description, a cross-section CS (see FIG. 5) orthogonal to the predetermined direction is an XY cross-section orthogonal to the Z direction.

The plurality of flow paths 10 are arranged in a grid pattern in directions (X and Y directions) orthogonal to the predetermined direction such that the first flow paths 11 and the second flow paths 12 are alternately arranged. The plurality of flow paths 10 are aligned in the X direction and the Y direction. As viewed in the Z direction, the plurality of flow paths 10 are arranged in a matrix via the partition walls 20, and are arranged in a rectangular shape as a whole.

Figure 4:
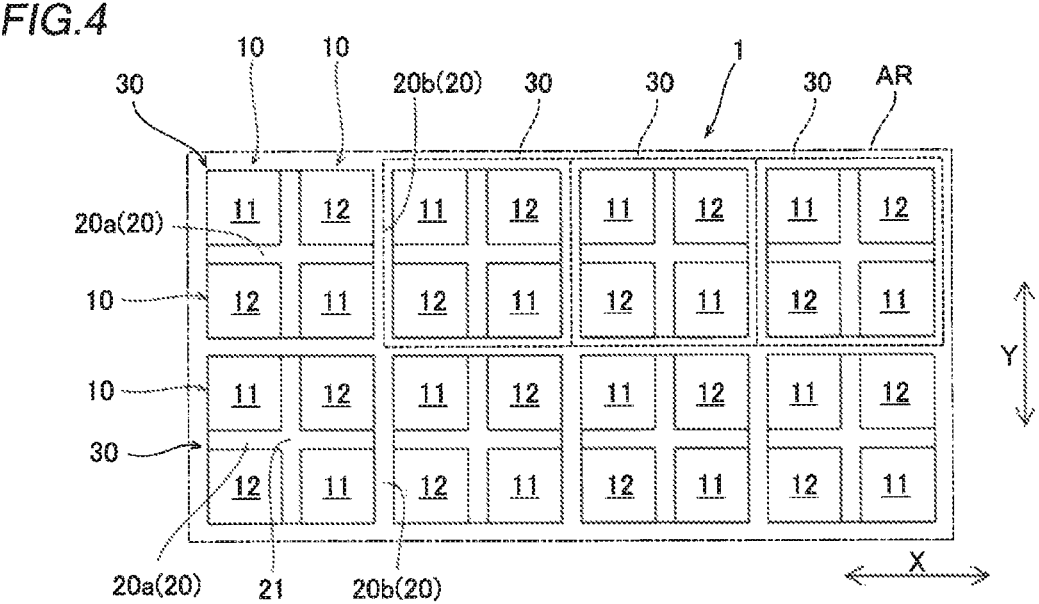
FIG. 4 An enlarged plan view of an end face of the core shown in FIG. 3 as viewed in a predetermined direction.

Specifically, as shown in FIG. 4 in which a region AR in FIG. 3 is enlarged, the first flow paths 11 are adjacent to the second flow paths 12 via the partition walls 20, and the second flow paths 12 are adjacent to the first flow paths 11 via the partition walls 20. On an end face of the core 1, the first flow paths 11 and the second flow paths 12 are alternately arranged in a checkered pattern. Therefore, in the cross-section CS orthogonal to the predetermined direction, each of the first flow paths 11 is surrounded by a plurality of second flow paths 12, and each of the second flow paths 12 is surrounded by a plurality of first flow paths 11.

The plurality of flow paths 10 form a plurality of unit structures 30 including a plurality of first flow paths 11 and a plurality of second flow paths 12. In the core 1 according to this embodiment, each of the unit structures 30 includes a total of four flow paths 10 arranged in a rectangular shape. The four flow paths 10 include two first flow paths 11 and two second flow paths 12. Each of the unit structures 30 includes a partition wall 20a that separates the four flow paths 10 and a partition wall 20b that defines the outer peripheral portion of the unit structure 30. That is, each individual unit structure 30 is separated by the rectangular partition wall 20b. As shown in FIG. 3, in the core 1, a plurality of unit structures 30 separated by the partition walls 20b are arranged side by side in the directions (X direction and Y direction) orthogonal to the predetermined direction. The unit structures 30 extend linearly in the Z direction from the first end to the second end of the core 1.

As shown in FIG. 4, the partition wall 20a partitions the inside of the partition wall 20b into individual flow paths 10. In this embodiment, the unit structure 30 includes the four flow paths 10, and thus the partition wall 20a has a shape in which wall portions intersect so as to partition the inside of the partition wall 20b into four hollow regions as viewed in the predetermined direction (Z direction).

<Structure of Flow Path>

As shown in FIG. 3, each unit structure 30 extends linearly in the Z direction, but each flow path 10 included in the unit structure 30 extends non-linearly in the Z direction. That is, in this embodiment, as shown in FIG. 5, the positions and outer shapes of the plurality of flow paths 10 in the cross-section CS orthogonal to the predetermined direction (Z direction) vary according to positions of the flow paths 10 in the predetermined direction.

Figure 5:
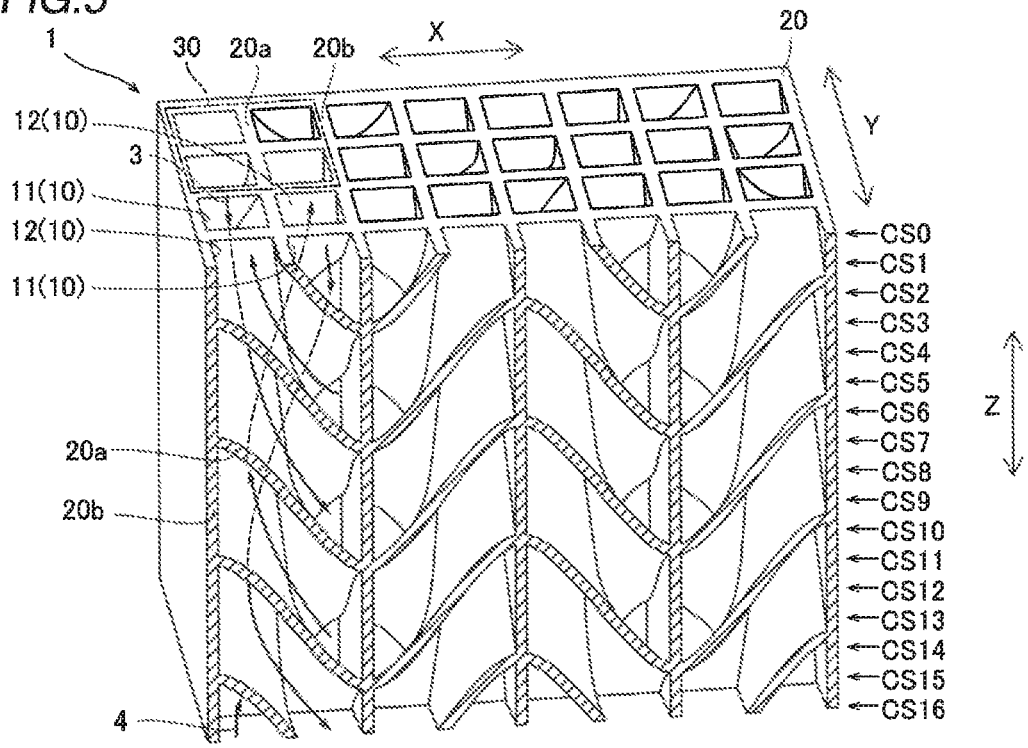
FIG. 5 A perspective sectional view showing an enlarged cross-section of a portion of the core shown in FIG. 3.

In an example of FIG. 5, the partition wall 20b that defines the outer shape of the unit structure 30 extends in the Z direction while maintaining the rectangular shape as viewed in the Z direction. Therefore, each individual unit structure 30 maintains the same rectangular shape in cross-sections CS (XY cross-sections) at any positions of the unit structure 30 in the Z direction.

On the other hand, the partition wall 20a that separates the individual flow paths 10 included in the unit structure 30 has a cross-sectional shape that varies in each cross-section CS (XY cross-section) according to its position in the Z direction. Consequently, the position and outer shape of each flow path 10 in the cross-section CS orthogonal to the Z direction vary according to a position of the flow path 10 in the Z direction.

Figure 6:
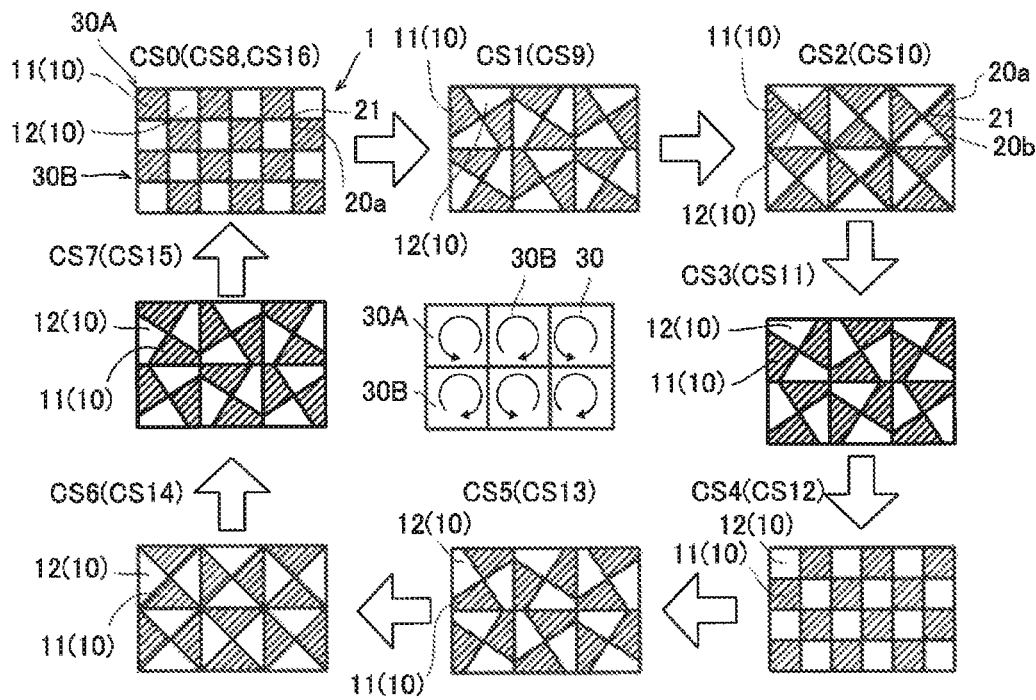
FIG. 6 A schematic diagram showing variations in the positions and shapes of flow paths in each cross-section according to a position in a predetermined direction.
Figure 7:
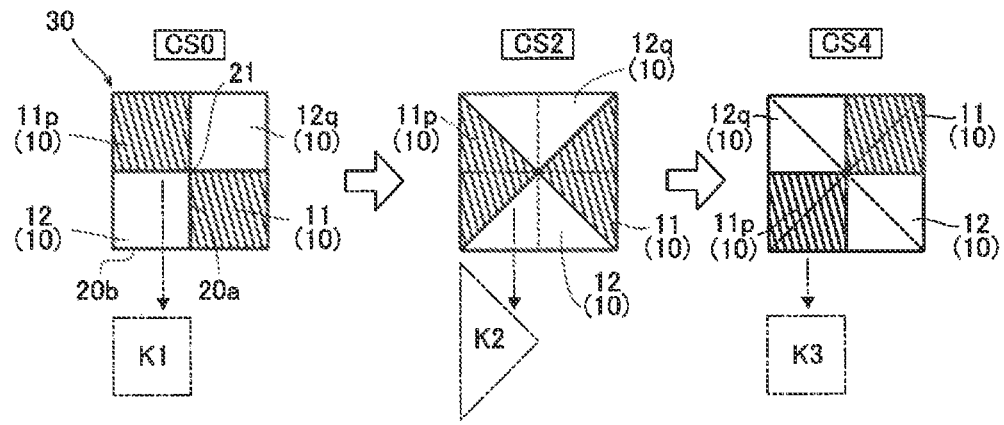
FIG. 7 A schematic diagram of cross-sections of the flow paths for illustrating variations in the positions and shapes of the flow paths.
Figure 8:
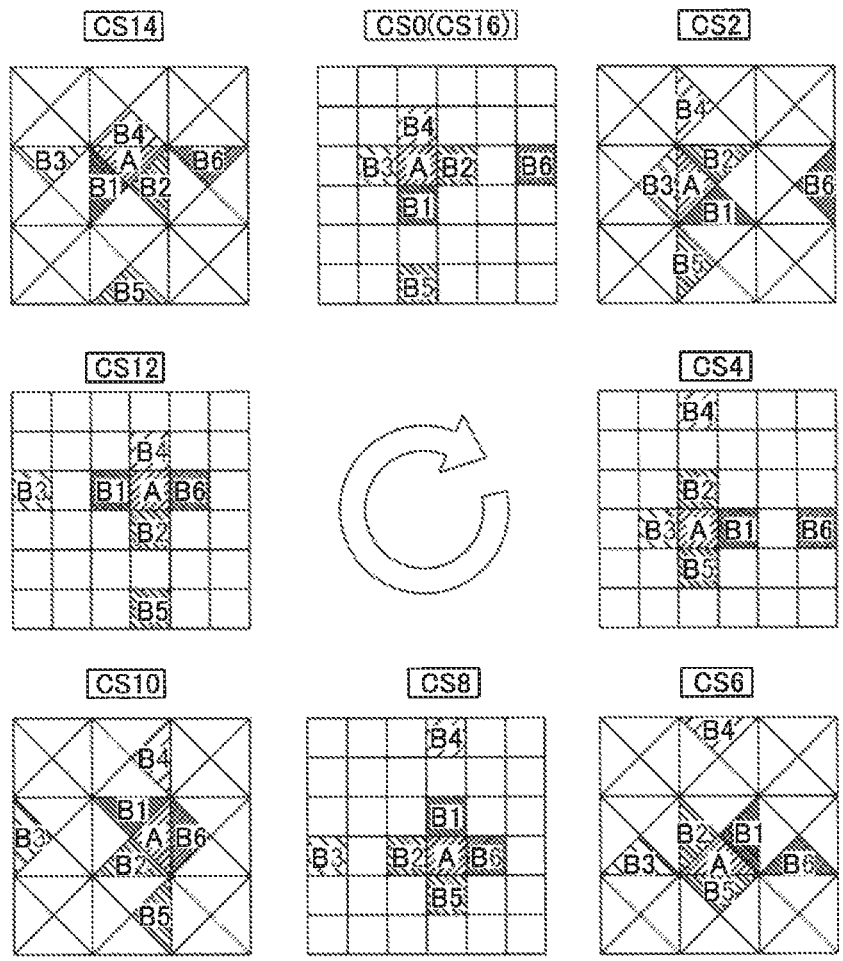
FIG. 8 A schematic diagram for illustrating a variation in the position of each flow path in each cross-section according to a position in the predetermined direction.

In the following description, for convenience, as shown in FIG. 5, seventeen locations from the first end (the upper end in FIG. 5) to the second end (the lower end in FIG. 5) of the core 1 in the Z direction are extracted, and cross-sections CS orthogonal to the Z direction at the seventeen locations are defined as CS0 to CS16, respectively. The cross-sections CS0 and CS16 correspond to end faces of the core 1, but these end faces are also included in the cross-sections CS orthogonal to the Z direction. FIG. 6 shows variations in the position and cross-sectional shape of each flow path 10 in the cross-sections CS0 to CS16. In FIGS. 6 to 8, the partition walls 20a and the partition walls 20b are shown by simple lines.

As shown in FIG. 6, in the cross-section CS, the position and the orientation of the partition wall 20a that separates the plurality of flow paths 10 vary such that the positions and outer shapes of the plurality of flow paths 10 vary.

That is, in an example of FIG. 6, in the cross-sections CS, the position and orientation of the partition wall 20a of each unit structure 30 continuously vary according to a position of the partition wall 20a in the Z direction. Specifically, the partition wall 20a rotates in each cross-section CS about an intersection 21 of the partition wall 20a that intersects in an X shape such that the position and orientation of the partition wall 20a vary.

For example, among six unit structures 30 shown in each cross-section CS, a unit structure 30A shown in the upper left corner is described. The partition wall 20a of the unit structure 30A rotates counterclockwise about the intersection 21 from the cross-section CS0 to the cross-section CS16. That is, the partition wall 20a of the unit structure 30A has a cross shape that intersects vertically and horizontally in the cross-section CS0, and the position and orientation of the partition wall 20a vary such that the partition wall 20a has a cross shape that intersects diagonally in the cross-section CS2 through the cross-section CS1. In the cross-section CS1, a process in which the partition wall 20a rotates counterclockwise about the intersection 21 appears between the cross-section CS0 and the cross-section CS2.

Similarly, the partition wall 20a further rotates counterclockwise and has a cross shape that intersects vertically and horizontally in the cross-section CS4 through the cross-section CS3. The rotation direction of the partition wall 20a in each unit structure 30 is shown in the center of FIG. 6.

The partition wall 20a separates the four flow paths 10 included in the unit structure 30, and thus the positions and outer shapes of the flow paths 10 separated by the partition wall 20a vary as the position and orientation of the partition wall 20a vary. Thus, in this embodiment, the positions and outer shapes of the first flow paths 11 and the second flow paths 12 included in each unit structure 30 vary in conjunction with variations in the position and orientation of the partition wall 20a between the flow paths 10 in the unit structure 30.

On the other hand, the partition wall 20b has not varied in any of the cross-sections CS, and the shape of the unit structure 30 itself has not varied. Inside each unit structure 30, the positions and outer shapes of the flow paths 10 vary.

Variations in the positions and outer shapes of the flow paths 10 are described in detail. The positions of the flow paths 10 included in the unit structure 30 are switched in the unit structure 30 while the outer shapes of the flow paths 10 in the cross-sections CS are varied by rotation (variations in position and orientation) of the partition wall 20a.

FIG. 7 is a diagram obtained by extracting the cross-sectional shape of one unit structure 30 in each of the cross-sections CS0, CS2, and CS4 in order to describe the variations in the positions and outer shapes of the flow paths 10. These cross-sections CS0, CS2, and CS4 are defined as cross-sections at a first position, a second position, and a third position in the predetermined direction (Z direction), respectively. For convenience, attention is paid to one first flow path 11p and one second flow path 12q among the flow paths 10 included in the unit structure 30.

As shown in FIG. 7, the flow paths 10 each has a first shape K1 in the cross-section CS0 that passes through the first position in the predetermined direction. In an example of FIG. 7, the first shape K1 is rectangular. In the unit structure 30, the first flow path 11p is located in the upper left corner of the figure, and the second flow path 12q is located in the upper right corner of the figure.

The outer shapes of the flow paths 10 each change to a second shape K2 that partially overlaps the first shape K1 as viewed in the predetermined direction in the cross-section CS2 that passes through the second position in the predetermined direction. In the process from the cross-section CS0 to the cross-section CS2, the partition wall 20*a* rotates 45 degrees. In the example of FIG. 7, the second shape K2 is triangular. The first flow path 11*p* is located at the left end in the figure, and the second flow path 12*q* is located at the upper end in the figure. In the cross-section CS2, the outer shapes of the flow paths 10 in the cross-section CS0 are shown by broken lines. In the cross-section CS2, the upper half of the triangular first flow path 11*p* in the figure overlaps the first flow path 11*p* in the cross-section CS0. Similarly, in the cross-section CS2, the right half of the triangular second flow path 12*q* in the figure overlaps the second flow path 12*q* in the cross-section CS0.

The flow paths 10 each partially overlap the second shape K2 as viewed in the predetermined direction in the cross-section CS4 that passes through the third position in the predetermined direction, and the outer shapes each change to a third shape K3 that does not overlap the first shape K1. In the process from the cross-section CS2 to the cross-section CS4, the partition wall 20*a* rotates 45 degrees. In the example of FIG. 7, the third shape K3 is rectangular. The first flow path 11*p* is located in the lower left corner of the figure, and the second flow path 12*q* is located in the upper left corner of the figure. In the cross-section CS4, the outer shapes of the flow paths 10 in the cross-section CS2 are shown by broken lines.

Thus, in the cross-section CS4, the upper left half of the rectangular first flow path 11*p* in the figure overlaps the first flow path 11*p* in the cross-section CS2. On the other hand, as can be seen by comparing the cross-section CS0 with the cross-section CS4, the first flow path 11*p* moves from the upper left corner of the figure to the lower left corner of the figure, and the first shape K1 and the third shape K3 do not overlap each other.

Similarly, in the cross-section CS4, the upper right half of the rectangular second flow path 12*q* in the figure overlaps the second flow path 12*q* in the cross-section CS2. As can be seen by comparing the cross-section CS0 with the cross-section CS4, the second flow path 12*q* moves from the upper right corner of the figure to the upper left corner of the figure, and the first shape K1 and the third shape K3 do not overlap each other.

Thus, the position of each flow path 10 in the cross-section CS varies with a variation in the outer shape in the cross-section CS according to a position of the flow path 10 in the Z direction.

In this embodiment, the positions and outer shapes of the flow paths 10 in the cross-section CS periodically vary such that the positions of the flow paths 10 in the cross-section CS vary according to positions in the predetermined direction between first ends to second ends of the flow paths 10, and then the flow paths 10 return to their original positions.

That is, in FIG. 7, the variations between the cross-sections CS0, CS2, and CS4 are shown as an example, but as can be seen from FIG. 6, each flow path 10 varies similarly in the remaining cross-sections.

That is, the partition wall 20*a* rotates 90 degrees about the intersection 21 from the cross-section CS0 to the cross-section CS4. Thus, the position of each flow path 10 in the cross-section CS0 changes to the position of the flow path 10 adjacent in the rotation direction of the partition wall 20*a* in the cross-section CS4. Similarly, the partition wall 20*a* rotates 90 degrees from the cross-section CS4 to the cross-section CS8, and the position of each flow path 10 in the cross-section CS4 changes to the position of the flow path 10 adjacent in the rotation direction of the partition wall 20*a* in the cross-section CS8. In each unit structure 30, the flow path 10 located in the upper left corner of the figure in the cross-section CS0 moves to the position of the lower right corner of the figure in the cross-section CS8.

The partition wall 20*a* rotates 90 degrees from the cross-section CS8 to the cross-section CS12, and the position of each flow path 10 in the cross-section CS8 changes to the position of the flow path 10 adjacent in the rotation direction of the partition wall 20*a* in the cross-section CS12. Furthermore, the partition wall 20*a* rotates 90 degrees from the cross-section CS12 to the cross-section CS16, and the position of each flow path 10 in the cross-section CS12 changes to the position of the flow path 10 adjacent in the rotation direction of the partition wall 20*a* in the cross-section CS16.

Thus, the partition wall 20*a* periodically varies so as to have the same cross-sectional shape every 90 degrees, and rotates 360 degrees from the cross-section CS0 to the cross-section CS16. Consequently, in the cross-section CS16, the position and the outer shape of each flow path 10 are in the same state as the cross-section CS0, and return to the original state.

Therefore, in the first embodiment, the positions of the flow paths 10 in the cross-section CS changes spirally between the first ends to the second ends of the flow paths 10. As shown in FIGS. 5 and 6, each flow path 10 is displaced along the rotation direction of the partition wall 20*a* from the cross-section CS0 to the cross-section CS16 (see the cross-sections CS0, CS4, CS8, CS12, and CS16). Therefore, each flow path 10 has a spiral shape in the predetermined direction (Z direction), as shown in FIG. 5. In FIG. 6, the cross-sections CS0 to CS16 are shown in fragments, but as can be seen from FIG. 5, the partition wall 20*a* continuously rotates according to its position in the Z direction, and the position and outer shape of each flow path 10 in the cross-section CS vary continuously from the first end to the second end.

The core 1 is of counter-flow type, and thus the inlets and outlets of the first flow paths 11 and the second flow paths 12 are opposite to each other. For example, in FIG. 5, when the first fluid 3 flows through the first flow paths 11 from the cross-section CS0 to the cross-section CS16, the second fluid 4 flows through the second flow paths 12 from the cross-section CS16 to the cross-section CS0. Consequently, in each unit structure 30, the first fluid 3 and the second fluid 4 flow spirally in opposite directions in the Z direction.

The positional relationship between the first flow paths 11 and the second flow paths 12 due to variations in the positions and the outer shapes thereof according to positions of the flow paths in the Z direction is now described.

In this embodiment, the positions and outer shapes of the flow paths 10 vary while a state in which the first flow paths 11 and the second flow paths 12 are adjacent to each other via the partition walls 20 is maintained.

As can be seen from FIG. 6, in the same unit structure 30, the positions and outer shapes of the four flow paths 10 vary in conjunction with rotation of the partition wall 20*a* according to its position in the Z direction, and thus the relationship in which the first flow paths 11 and the second flow paths 12 are alternately arranged is maintained. That is, even when the position and outer shape of each flow path 10 vary, the first flow paths 11 or the second flow paths 12 are not adjacent to each other in the unit structure 30.

As to the first flow paths 11 and the second flow paths 12 of the two adjacent unit structures 30, the positions and outer shapes of the respective flow paths 10 vary while a state in which the first flow paths 11 and the second flow paths 12 are adjacent to each other via the partition wall 20*b*. Specifically, as can be seen from FIG. 6, in the two adjacent unit structures 30, the rotation directions of the partition walls 20*a* according to their positions in the Z direction are opposite to each other.

For example, in the unit structure 30A in the upper left corner of the figure among the six unit structures 30 shown in FIG. 6, the partition wall 20*a* rotates counterclockwise from the cross-section CS0 to the cross-section CS16. On the other hand, in two unit structures 30B adjacent to the unit structure 30A (adjacent to the right side and the lower side in the figure), the partition wall 20*a* rotates clockwise from the cross-section CS0 to the cross-section CS16. Therefore, in the unit structure 30A and the unit structures 30B adjacent to the unit structure 30A, the positions of the first flow paths 11 and the positions of the second flow paths 12 are switched. Consequently, the positions of the first flow paths 11 and the positions of the second flow paths 12 vary such that the second flow paths 12 of the unit structures 30B are adjacent to the first flow paths 11 of the unit structure 30A via the partition walls 20*b* that separate the unit structure 30A and the unit structures 30B. Similarly, the positions of the first flow paths 11 and the positions of the second flow paths 12 vary such that the first flow paths 11 of the unit structures 30B are adjacent to the second flow paths 12 of the unit structure 30A via the partition walls 20*b* that separate the unit structure 30A and the unit structures 30B.

Thus, in this embodiment, in any of the cross-sections CS0 to CS16 between the first ends to the second ends of the flow paths 10, a state in which the first flow paths 11 or the second flow paths 12 are not adjacent to each other, but the first flow paths 11 and the second flow paths 12 are adjacent to each other via the partition walls 20*a* or the partition walls 20*b* is maintained. Consequently, in this embodiment, in the cross-section CS at each position in the Z direction, heat transfer surfaces between the first flow paths 11 and the second flow paths 12 include only primary heat transfer surfaces defined by the partition walls 20*a* or the partition walls 20*b*.

In this embodiment, as shown in FIG. 8, the positions of the plurality of flow paths 10 in the cross-section CS vary between the first ends to the second ends in the predetermined direction (from the cross-section CS0 to the cross-section CS16) such that the adjacent flow paths 10 are switched to other flow paths 10.

FIG. 8 shows 3×3 (nine) unit structures 30 in the cross-sections CS. Attention is paid to the flow path 10 indicated by A in the figure. The flow path 10 indicated by A is the first flow path 11.

In the cross-section CS0, the flow path A is adjacent to the four second flow paths 12 of B1 to B4. In the cross-section CS0, the two second flow paths 12 of B5 and B6 are spaced apart from the flow path A and are not adjacent thereto.

The flow path A moves, in the cross-section CS4, to a position at which the flow path B1 is located in the cross-section CS0 as the partition wall 20*a* rotates counterclockwise according to its position in the Z direction (see the cross-section CS2). In the cross-section CS4, the flow path B5 moves from the position in the cross-section CS0 to the position of the flow path next thereto as the partition wall 20*a* rotates clockwise. Consequently, in the cross-section CS4, the flow path A and the flow path B5 are adjacent to each other. On the other hand, the flow path B4 adjacent to the flow path A in the cross-section CS0 moves to a position away from the flow path A in the cross-section CS4. In the cross-section CS4, the flow path A is adjacent to the four second flow paths 12 of B1, B2, B3, and B5.

Similarly, in the cross-section CS8, the flow path A is adjacent to the four second flow paths 12 of B1, B2, B5, and B6. In the cross-section CS12, the flow path A is adjacent to the four second flow paths 12 of B1, B2, B4, and B6. Thus, in this embodiment, the adjacent flow paths 10 are switched to other flow paths 10.

In this embodiment, the adjacent flow paths 10 are switched between the first ends to the second ends in the predetermined direction (Z direction) such that each of the first flow paths 11 is adjacent to more different second flow paths 12 than can be concurrently adjacent in any cross-section CS.

That is, with the flow path A as the first flow path 11, the maximum number of second flow paths 12 to which the flow path A can be adjacent is four. In other words, when the flow path A has a rectangular outer shape, the second flow path 12 can be adjacent to each of the four sides.

A state in which the flow path A is constantly adjacent to the flow path B1 and the flow path B2 included in the same unit structure 30 via the partition wall 20*a* is maintained, and the flow path A is adjacent to the flow paths included in other unit structures 30 on the remaining two sides defined by the partition walls 20*b*. As described above, the flow path A is adjacent to two of the four second flow paths 12 of B3, B4, B5, and B6 while the two second flow paths 12 are switched due to the positional variations in the cross-sections CS0, CS4, CS8, and CS12. Therefore, in an example of FIG. 8, the flow path A is adjacent to six second flow paths 12 of B1, B2, B3, B4, B5, and B6 between the first end to the second end, while the number of flow paths that can be adjacent at the same time is four. Thus, one first flow path 11 that can exchange heat with three or four second flow paths 12 in each cross-section CS can exchange heat with a total of six second flow paths 12 between the first end to the second end of the flow path.

(Distributor)

The configuration of the distributor 50 of the header 2 is now described. As shown in FIG. 2, the distributor 50 is provided at the first end or the second end of the core 1 and communicates with each flow path 10 of the core 1. The distributor 50 covers the entire first end face or the entire second end face of the core 1 shown in FIG. 3, and includes fluid passages 51 connected to the individual flow paths 10. In a configuration example of FIG. 2, the fluid passages 51 of the distributor 50 include fluid passages 51*a* connected to one of the first flow paths 11 and the second flow paths 12, and fluid passages 51*b* connected to the other of the first flow paths 11 and the second flow paths 12.

Taking the header 2*a* as an example, the fluid passages 51*a* communicate with the inlet 41 provided in a lateral direction (Y direction) orthogonal to the Z direction, and are connected to the first flow paths 11 that open at the end faces of the core 1 in the Z direction. The fluid passages 51*b* communicate with the outlet 42 provided at a position extended in the Z direction with respect to the core 1, and are connected to the second flow paths 12 that open at the end faces of the core 1 in the Z direction. The distributor 50 of the header 2*b* also has the same structure.

Figure 9:
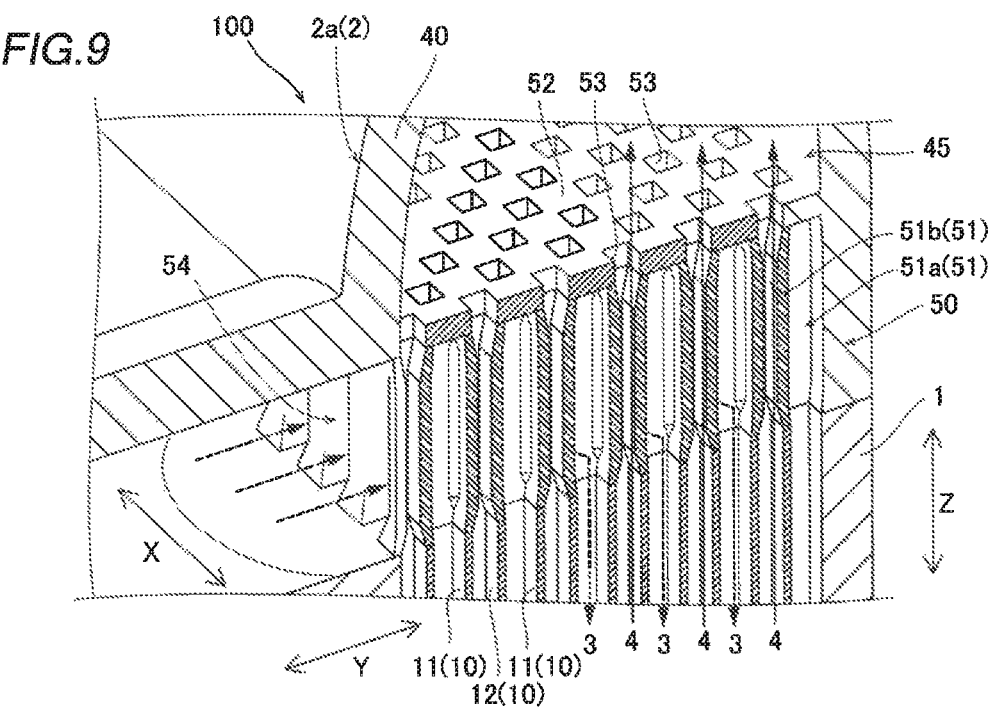
FIG. 9 A schematic perspective sectional view of the heat exchanger for illustrating the structure of a distributor.

Specifically, as shown in FIG. 9, the fluid passages 51*b* of the distributor 50 are connected to openings of the second flow paths 12 arranged in a checkered pattern, and have a tubular shape that extends in the Z direction. The second fluid 4 flows through the tubular fluid passages 51*b*. The fluid passages 51*b* are connected to a baffle 52 that partitions the inside of the cover 40 at the ends in the Z direction. The baffle 52 includes a plurality of through-holes 53 respectively corresponding to the positions of the fluid passages 51b, and allows the second fluid 4 to pass therethrough. The fluid passages 51b and the through-holes 53 are provided in the same number as that of the second flow paths 12 of the core 1, and are connected one-to-one. On the other hand, the baffle 52 does not include through-holes through which the first fluid 3 passes. The second fluid 4 that has passed through the second flow paths 12 of the core 1 passes through the fluid passages 51b of the distributor 50 and the through-holes 53 of the baffle 52, merges at a confluence 45 of the header 2, and is discharged from the outlet 42 (see FIG. 2) connected to the confluence 45. The confluence 45 is inside the cover 40 and is a region between the baffle 52 and the outlet 42.

The fluid passages 51a of the distributor 50 are not formed as tubular flow paths, but are defined by spaces between the end face of the core 1 and the baffle 52. To be more precise, the fluid passages 51a are spaces surrounded by the end face of the core 1, the baffle 52, and the cover 40, and are spatial portions between (outside) the fluid passages 51b.

Figure 10:
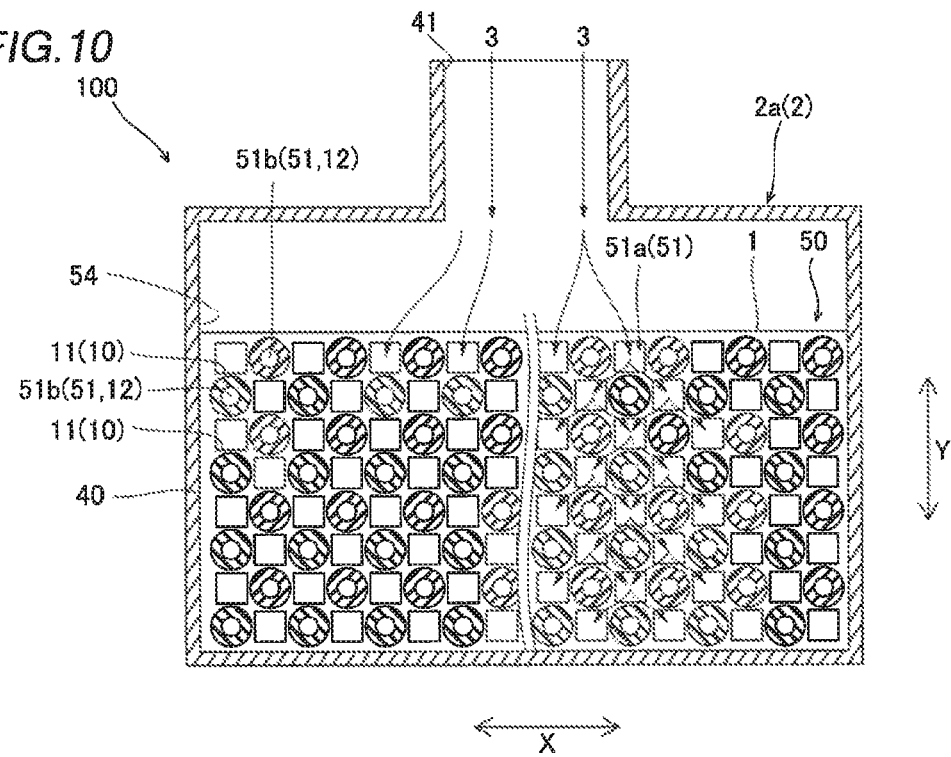
FIG. 10 A schematic sectional view of the distributor as viewed in the predetermined direction.

As shown in FIG. 10, the first flow paths 11 of the core 1 open into spaces of the fluid passages 51a of the distributor 50. The tubular fluid passages 51b are separated from each other in a cross-section (XY cross-section) orthogonal to the Z direction, and a gap is formed between the fluid passages 51b. In examples of FIGS. 9 and 10, after the fluid passages 51b are connected to the openings (see FIG. 3) of the second flow paths 12 having a rectangular shape, the outer shapes thereof vary so as to become tubular passages each having a circular cross-section midway such that a gap is secured between the fluid passages 51b. Openings of the first flow paths 11 arranged in a checkered pattern communicate with each other via the gap between the fluid passages 51b in the fluid passages 51a. The fluid passages 51a communicate with the inlet 41 for the first fluid 3 via an opening portion 54 connected to the inlet 41. The first fluid 3 that has flowed in from the inlet 41 passes between the fluid passages 51b in the fluid passages 51a and flows into the first flow paths 11 that open at the end faces of the core 1.

The fluid passages 51a communicate with the first flow paths 11, and the fluid passages 51b communicate with the second flow paths 12 also in the distributor 50 on the header 2b (see FIG. 2) side. Therefore, as shown in FIG. 2, the first fluid 3 that has passed through the first flow paths 11 of the core 1 passes between the fluid passages 51b in the fluid passages 51a, and is discharged from the outlet 43 for the first fluid 3 via the opening portion 54. The second fluid 4 that has flowed into the confluence 45 from the inlet 44 passes through the fluid passages 51b of the distributor 50 and the through-holes 53 of the baffle 52, and flows into the second flow paths 12 that open at the end faces of the core 1.

The first fluid 3 and the second fluid 4 that have flowed into the core 1 flow inside the spirally formed first flow paths 11 and second flow paths 12 in the opposite directions in the Z direction. In the process in which the first fluid 3 and the second fluid 4 flow through the first flow paths 11 and the second flow paths 12, respectively, heat is exchanged between the first flow paths 11 and the second flow paths 12 adjacent to each other via the partition walls 20a or the partition walls 20b. After heat is exchanged, the first fluid 3 and the second fluid 4 flow out of the end faces of the core 1 on the opposite sides, respectively, and flow out of the outlet 43 and the outlet 42 via the distributors 50, respectively. The fluid passages 51a may be connected to the second flow paths 12, and the fluid passages 51b may be connected to the first flow paths 11.

The heat exchanger 100 according to this embodiment is configured as described above.

Each of the core 1 and the header 2 of the heat exchanger 100 may be a three-dimensional structure formed by an additive manufacturing method, for example. Specifically, the additive manufacturing method is a powder additive manufacturing method. The powder additive manufacturing method is a method for fabricating a three-dimensional structure by repeating, in a stacking direction (fabricating direction), a process to form a layered portion by spreading a powder material in layers and irradiating a portion to be fabricated with a laser or an electron beam to melt and solidify it, so as to stack the layered portion in the stacking direction. The powder material is an iron-based, copper-based, titanium-based, or aluminum-based metal material, for example, and aluminum (or an aluminum alloy), for example, is preferable from the viewpoint of weight, mechanical strength, heat transfer performance, etc.

In this embodiment, the heat exchanger 100 may be configured by integrally forming the core 1 and the header 2 (as a single component) separately by the additive manufacturing method and then bonding the same to each other. Alternatively, the entire heat exchanger 100 including the core 1 and the header 2 may be integrally formed by the additive manufacturing method.

(Advantageous Effects of This Embodiment)

According to this embodiment, the following advantageous effects are achieved.

According to this embodiment, as described above, the position and outer shape of each of the flow paths 10 in the cross-section CS orthogonal to the predetermined direction vary according to a position of the flow path 10 in the predetermined direction (Z direction), and thus an action of fluctuating and agitating the flow of the first fluid 3 and the second fluid 4 that flow through the flow paths 10 can be obtained. By agitating, a temperature boundary layer formed when the first fluid 3 and the second fluid 4 flow through the flow paths 10 can be destroyed to improve the heat exchange efficiency. Furthermore, in a common heat exchanger, the positions and outer shapes of flow paths 10 in a cross-section CS are often maintained constant, and in order to fluctuate the fluid flow, structures that become obstacles are often provided inside the flow paths. In this case, an increase in the pressure loss of the flow paths tends to be large due to the influence of the obstacles, whereas with the above configuration, the positions and outer shapes of the entire flow paths 10 in the cross-section CS can be varied. Thus, an action of fluctuating and agitating the flow can be obtained without providing obstacles in the flow paths 10, and an increase in pressure loss can be significantly reduced or prevented. Even when obstacles are provided in the flow paths 10, further improvement in heat exchange efficiency can be expected due to the synergistic effect of the variations in the positions and outer shapes of the flow paths 10 in the cross-section CS and the obstacles although the pressure loss increases. From the above, it is possible to provide the heat exchanger 100 having a novel structure and capable of improving the heat exchange efficiency.

According to this embodiment, as described above, the position and outer shape of each of the flow paths 10 vary while a state in which the first flow paths 11 and the second flow paths 12 are adjacent to each other via the partition walls 20 is maintained. Accordingly, the flow paths 10 can be arranged such that a plurality of second flow paths 12 surround a first flow path 11, and a plurality of first flow paths 11 surround a second flow path 12. Therefore, the inner peripheral surfaces of the tubular flow paths 10 (the inner peripheral surfaces of the partition walls 20) can serve as the primary heat transfer surfaces over the entire circumferences. Even when the positions and outer shapes of the flow paths 10 in the cross-section CS are varied, heat exchange between the first fluid 3 and the second fluid 4 can be performed via the primary heat transfer surfaces defined by the partition walls 20 of the flow paths 10. Therefore, the heat exchange efficiency can be further improved as compared with a case in which a secondary heat transfer surface such as a corrugated fin is provided.

According to this embodiment, as described above, the position and outer shape of each of the flow paths 10 vary due to variations in the positions and orientations of the partition walls 20a that separate the flow paths 10 in each cross-sectional CS. Accordingly, the positions and outer shapes of the flow paths 10 can be easily varied by simply varying the positions and orientations of the partition walls 20a without increasing or decreasing the number of partition walls 20 or providing structures on the partition walls 20a.

According to this embodiment, as described above, each of the flow paths 10 has the first shape K1 in the cross-section CS that passes through the first position in the predetermined direction (Z direction), and the outer shape of each of the flow paths 10 changes to the second shape K2 that partially overlaps the first shape K1 as viewed in the predetermined direction in the-cross section CS that passes through the second position in the predetermined direction, and changes to the third shape K3 that partially overlaps the second shape K2 and does not overlap the first shape K1 as viewed in the predetermined direction in the-cross section CS that passes through the third position in the predetermined direction. That is, the outer shape of the flow path 10 changes from the first shape K1 to the third shape K3 via the second shape K2 according to the position thereof in the predetermined direction such that the position of the flow path 10 changes to a position completely deviated as viewed in the predetermined direction. Accordingly, the first fluid 3 and the second fluid 4 that flow through the flow paths 10 can be moved greatly in the direction orthogonal to the predetermined direction and effectively agitated, and thus the heat exchange efficiency can be more effectively improved.

According to this embodiment, as described above, the positions and outer shapes of the flow paths 10 in the cross-section CS periodically vary such that the positions of the flow paths 10 in the cross-section CS vary according to positions in the predetermined direction between the first ends to the second ends of the flow paths 10, and then the flow paths 10 return to their original positions. Accordingly, at the outlets of the flow paths 10, the flow paths 10 can return to the same positions as their original positions at the inlets of the flow paths 10 after the positions of the flow paths 10 in the cross-section CS vary from the inlets toward the outlets. In this case, the inlets and outlets of the flow paths 10 are arranged in the same manner as viewed in the predetermined direction (Z direction), and thus the design of the heat exchanger 100 can be facilitated. When the periodic variation is repeated a plurality of times, the flow paths 10 only need to repeat a shape variation for one cycle, and thus the design of the heat exchanger 100 can be facilitated.

According to this embodiment, as described above, the positions of the flow paths 10 in the cross-section CS change spirally between the first ends to the second ends of the flow paths 10. Accordingly, it is possible to impart, to the flow of the first fluid 3 and the second fluid 4 in the flow paths 10, a motion component to rotate (turn) the flow of the first fluid 3 and the second fluid 4 in the cross-section CS, and thus the first fluid 3 and the second fluid 4 can be effectively agitated. Furthermore, the positions of the flow paths 10 can be spirally changed regularly, and thus the design of the heat exchanger 100 can be facilitated.

According to this embodiment, as described above, the positions and outer shapes of the first flow paths 11 and the second flow paths 12 included in each unit structure 30 vary in conjunction with variations in the position and orientation of the partition wall 20 between the flow paths 10 in the unit structure 30. Accordingly, the positions and outer shapes of the flow paths 10 can be varied while the heat transfer surfaces defined by the partition wall 20a between the first flow paths 11 and the second flow paths 12 in the unit structure 30 are maintained. Therefore, even when the positions and outer shapes of the flow paths 10 are varied while the first fluid 3 and the second fluid 4 are agitated by variations in the positions and outer shapes of the flow paths 10, the heat transfer surfaces between the first flow paths 11 and the second flow paths 12 can be secured.

According to this embodiment, as described above, the positions of the plurality of flow paths 10 in the cross-section CS vary between the first ends to the second ends of the flow paths 10 in the predetermined direction such that the adjacent flow paths 10 are switched to other flow paths 10. Accordingly, as shown in FIG. 8, for example, at the inlet positions of the flow paths 10, the first flow path 11 (flow path A) is adjacent to the predetermined second flow paths 12 (flow paths B1 to B4), and in the process toward the outlets of the flow paths 10, the same first flow path 11 (flow path A) is adjacent to other second flow paths 12 (flow paths B5 and B6). Thus, heat exchange can be performed between more flow paths 10, and thus generation of a difference in temperature distribution for each flow path 10 due to drift or the like can be significantly reduced or prevented.

According to this embodiment, as described above, the adjacent flow paths 10 are switched between the first ends to the second ends of the flow paths 10 in the predetermined direction such that the first flow path 11 is adjacent to more different second flow paths 12 than can be concurrently adjacent in any cross-section CS. Accordingly, the adjacent flow paths 10 are switched such that the first flow path 11 can be adjacent to more second flow paths 12 than the number of adjacent second flow paths 12 at the inlets of the flow paths 10, for example, so as to exchange heat with each second flow path 12. Thus, a difference in temperature distribution for each flow path 10 can be effectively significantly reduced or prevented.

MODIFIED EXAMPLES

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which a plurality of flow paths 10 form a unit structure 30 has been shown in the aforementioned embodiment, the present invention is not restricted to this. In the present invention, a plurality of flow paths 10 may not form a unit structure 30. In this case, the positions and shapes of the flow paths 10 may not be varied in conjunction with each other in one unit (unit structure) but may be varied separately according to positions of the flow paths 10 in the predetermined direction (Z direction).

Figure 11:
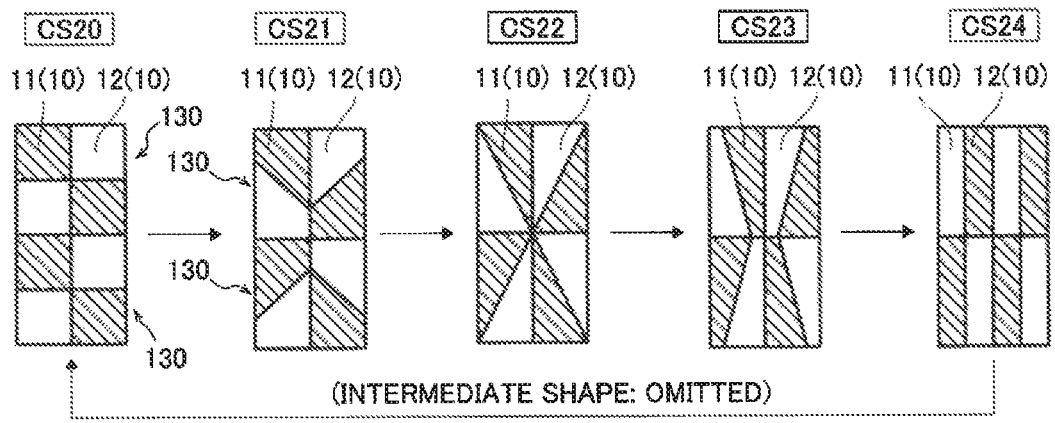
FIG. 11 A schematic diagram showing a modified example of the unit structure.

While the example in which the unit structure 30 includes four flow paths 10 (two first flow paths 11 and two second flow paths 12) has been shown in the aforementioned embodiment, the number of flow paths 10 included in the unit structure 30 may be less than four or five or more. For example, in a modified example shown in FIG. 11, one unit structure 130 includes two flow paths 10. The unit structure 130 shown in FIG. 11 includes one first flow path 11 and one second flow path 12. FIG. 11 illustrates four unit structures 130. In FIG. 11, each flow path 10 having a substantially square outer shape in a cross-section CS20 varies in order of cross-sections CS21, CS22, CS23, and CS24 due to variations in the position and orientation of a partition wall 20a according to its position in a predetermined direction (Z direction). In the cross-section CS24, each flow path 10 has a vertically long rectangular outer shape. Although a variation in intermediate shape is omitted, the state of the cross-section CS24 returns to the state of the cross-section CS20 due to a variation in cross-sectional shape according to a position of the flow path 10 in the predetermined direction (Z direction).

While the example in which in each cross-section CS, each flow path 10 is deformed so as to have substantially the same outer shape has been shown in the aforementioned embodiment, the present invention is not restricted to this. The shape of each flow path 10 may be different. For example, when the flow rates of the first fluid 3 and the second fluid 4 are different, among the flow paths 10, one of the first flow path 11 and the second flow path 12 may have a larger flow path cross-sectional area, and the other of the first flow path 11 and the second flow path 12 may have a smaller flow path cross-sectional area depending on the flow rate ratio.

Figure 12:
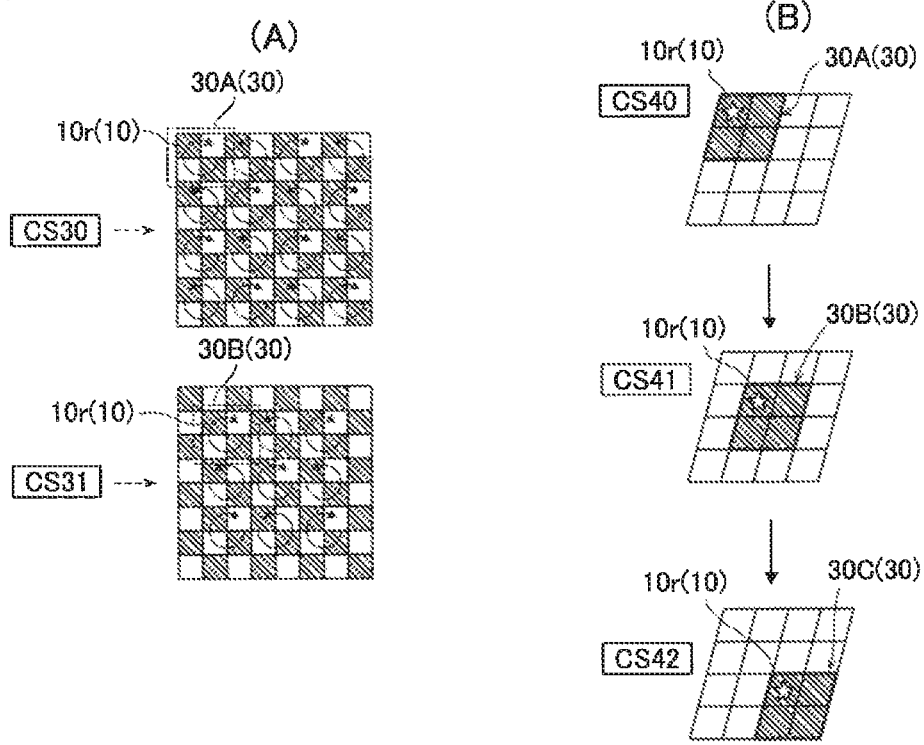
FIG. 12 Views (A) and (B) for illustrating a modified example in which the position of a flow path moves across a plurality of unit structures.

While the example in which within each unit structure 30, the positions and outer shapes of the flow paths 10 vary according to positions of the flow paths in the predetermined direction (Z direction) has been shown in the aforementioned embodiment, the present invention is not restricted to this. In the present invention, the positions and shapes of the flow paths 10 may vary across different unit structures 30. In other words, the flow paths 10 of the unit structure 30 may be switched according to positions of the flow paths 10 in the predetermined direction (Z direction). For example, as shown in FIG. 12(A), in a cross-section CS30 at a certain position of a flow path 10r in a Z direction, the position of the flow path 10r changes spirally within a first unit structure 30D, and in a cross-section CS31 at another position of the flow path 10r in the Z direction, the position of the flow path 10r changes spirally within a second unit structure 30E. At this time, flow paths included in the first unit structure 30D partially overlap flow paths included in the second unit structure 30E.

More simply, in a cross-section CS40 shown in FIG. 12(B), the flow path 10r (see a star mark) included in the first unit structure 30D moves from the upper left corner of the figure to the lower right corner of the figure in the first unit structure 30D due to the spiral positional change in the first unit structure 30D. In a cross-section CS41, the position of the flow path 10r changes spirally within the second unit structure 30E including the flow path 10r. The flow path 10r moves from the upper left corner of the figure to the lower right corner of the figure in the second unit structure 30E due to the positional change. In a cross-section CS42, the position of the flow path 10r changes spirally within a third unit structure 30F including the flow path 10r. The flow path 10r moves from the upper left corner of the figure to the lower right corner of the figure in the third unit structure 30F due to the positional change. Such a positional change in the flow path 10r is repeated according to a position of the flow path 10r in the Z direction such that the flow path 10r can move greatly in the core 1, and one flow path 10r can be adjacent to a larger number of other flow paths so as to exchange heat with them.

Figure 13:
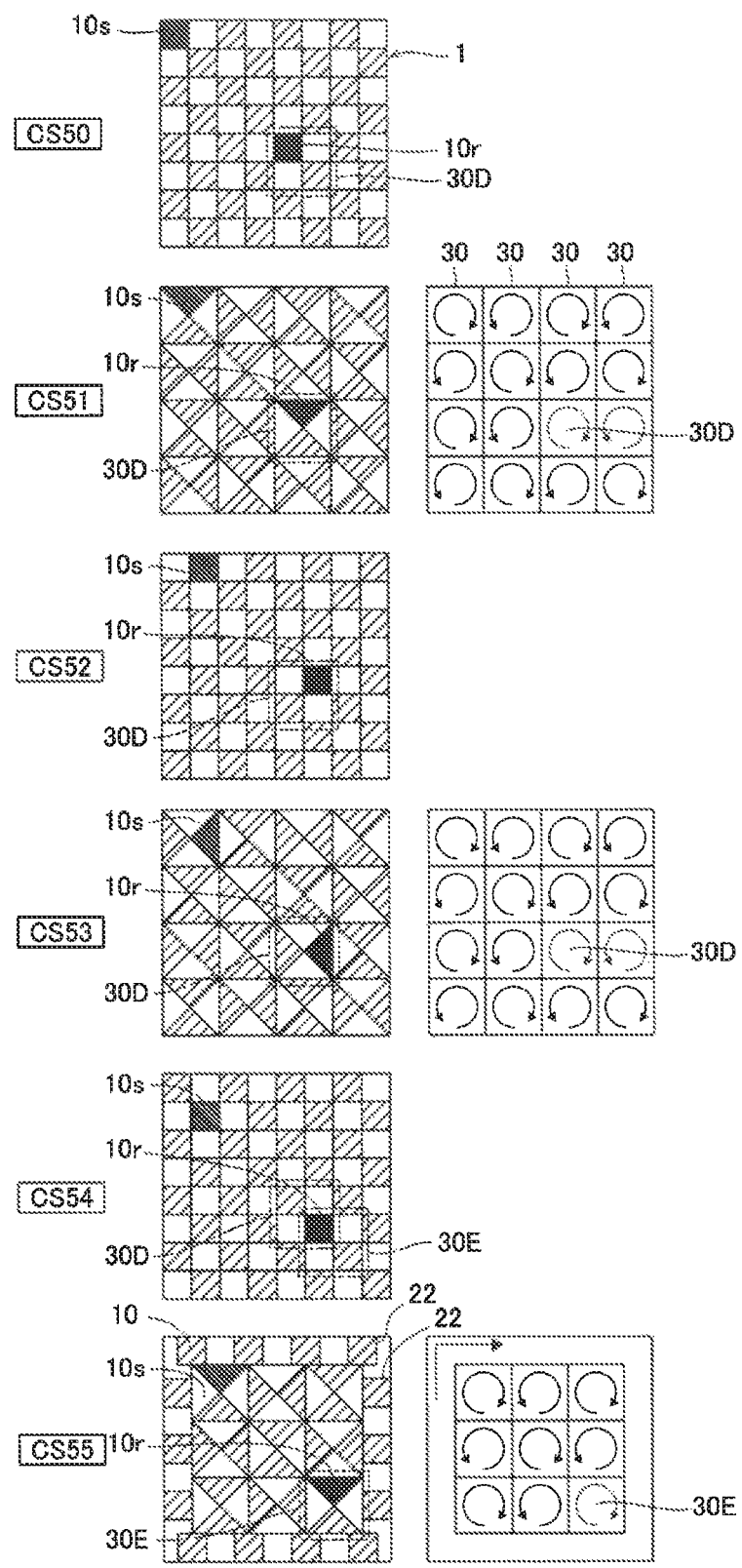
FIG. 13 A first diagram showing a specific example in which the position of the flow path moves across the plurality of unit structures in each cross-section.
Figure 14:
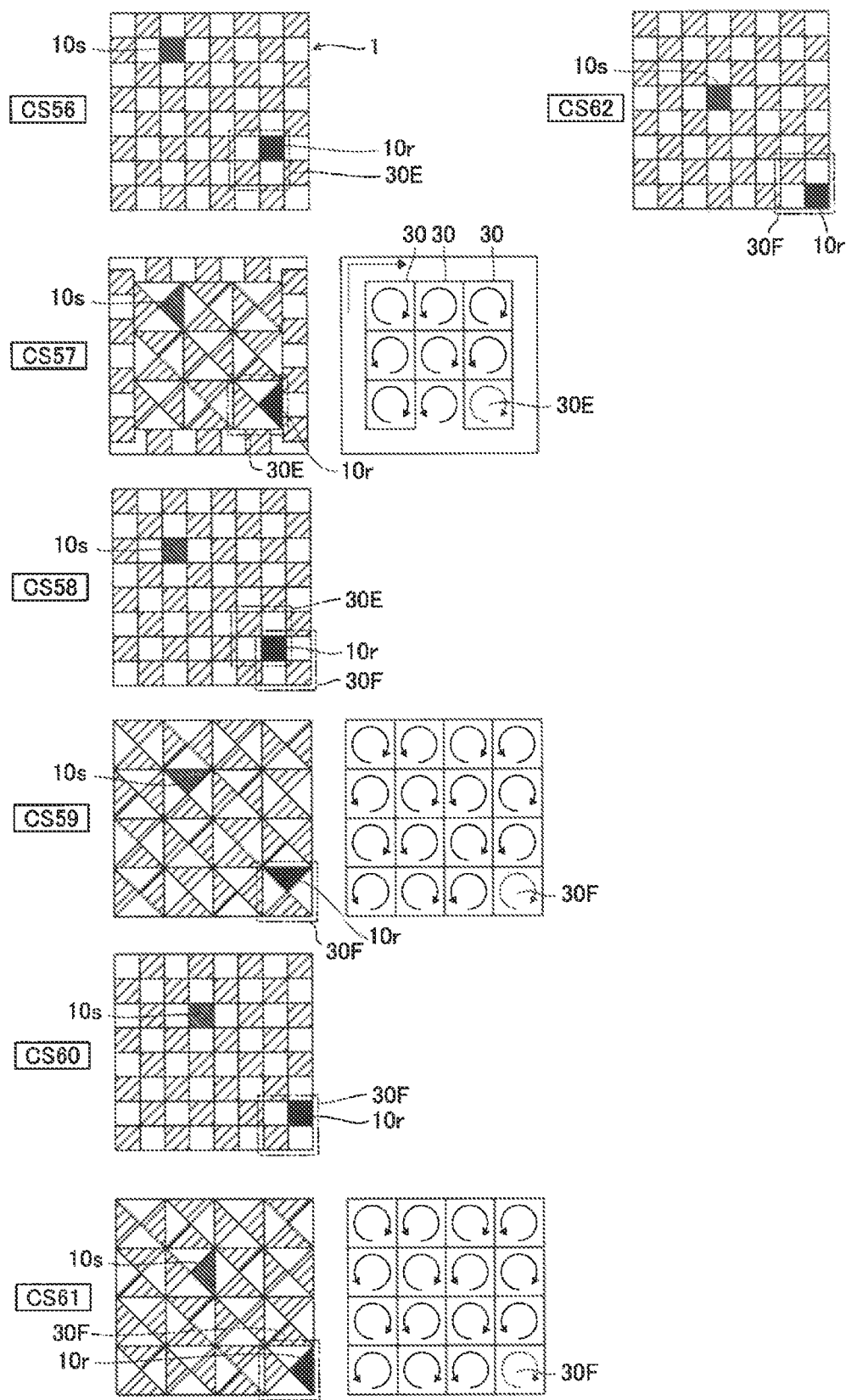
FIG. 14 A second diagram showing the specific example in which the position of the flow path moves across the plurality of unit structures in each cross-section.

FIGS. 13 and 14 show a specific example in which the positions and shapes of flow paths 10 vary across a plurality of unit structures 30. Description is made focusing on a flow path 10r filled with black in a cross-section CS50 of a core 1 including 8×8 flow paths. In the process from the cross-section CS50 to a cross-section CS54, sixteen unit structures 30 each including 2×2 flow paths 10 are configured without a gap from the outermost periphery of the core 1, and in each of the sixteen unit structures 30, the positions and shapes of the flow paths 10 vary. The flow path 10r moves from the upper left corner of the figure to the lower right corner of the figure within a unit structure 30D.

On the other hand, in the process from the cross-section CS54 to a cross-section CS58, nine unit structures 30 each including 2×2 flow paths 10 are configured by 6×6 flow paths 10 excluding the flow paths 10 located on the outermost periphery of the core 1, and the positions and shapes of the flow paths 10 vary in each of the nine unit structures 30. In the process from the cross-section CS54 to the cross-section CS58, the flow path 10r moves as a portion of the unit structure 30E from the upper left corner of the figure to the lower right corner of the figure. The positions of the outermost flow paths 10 that do not form the unit structures 30 vary along the outer periphery of the core 1 due to variations in the positions of the partition walls 22 in the process from the cross-section CS54 to the cross-section CS58.

In the process from the cross-section CS58 to a cross-section CS62, sixteen unit structures 30 each including 2×2 flow paths 10 are configured again from the outermost periphery of the core 1. The positions and shapes of the flow paths 10 vary in each of the sixteen unit structures 30. In the process from the cross-section CS58 to the cross-section CS62, the flow path 10r moves as a part of the unit structure 30F from the upper left corner of the figure to the lower right corner of the figure in the unit structure 30F. Consequently, the flow path 10r located at a central portion of the core 1 in the cross-section CS50 moves across the unit structures 30D, 30E, and 30F, and thus in the-cross section CS62, the flow path 10r moves to the lower right corner of the figure in the core 1.

Similarly, focusing on a flow path 10s located in the upper left corner of the figure in the cross-section CS58, the flow path 10s moves from the upper left corner of the figure to a central portion of the figure in the core 1 in the process from the cross-section CS58 to the cross-section CS62. Similarly, the other flow paths 10 can move greatly in the core 1 across a plurality of unit structures 30.

While the example in which a plurality of flow paths 10 are arranged in a grid pattern in the direction orthogonal to the predetermined direction has been shown in the aforementioned embodiment, the present invention is not restricted to this. In the present invention, the flow paths may not be arranged in a grid pattern.

While the example in which the first flow path 11 is not adjacent to another first flow path 11, and the second flow path 12 is not adjacent to another second flow path 12 has been shown in the aforementioned embodiment, the present invention is not restricted to this. In the present invention, the first flow paths 11 may be adjacent to each other, and the second flow paths 12 may be adjacent to each other. For example, the first flow paths 11 may be linearly arranged adjacent to each other, the second flow paths 12 may be linearly arranged adjacent to each other, a row of the linearly arranged first flow paths 11 and a row of the linearly arranged second flow paths 12 may face each other such that the first flow paths 11 and the second flow paths 12 are adjacent to each other via the partition walls.

While the example in which the positions and outer shapes of the flow paths 10 vary while a state in which the first flow paths 11 and the second flow paths 12 are adjacent to each other via the partition walls 20 is maintained has been shown in the aforementioned embodiment, the present invention is not restricted to this. In the present invention, in the process in which the positions and outer shapes of the flow paths 10 vary, a state in which the first flow paths 11 and the second flow paths 12 are not adjacent to each other may be partially included.

While the example in which in each cross-sectional CS, the positions and outer shapes of the flow paths 10 vary due to variations in the positions and orientations of the partition walls 20a that separate the flow paths 10 has been shown in the aforementioned embodiment, the present invention is not restricted to this. In the present invention, the positions and outer shapes of the flow paths 10 may vary due to removal of a portion of the partition walls 20a that separate the flow paths 10 or an increase in the number of partition walls 20a according to their positions in the Z direction.

While the example in which as shown in FIG. 7, the outer shape of the flow path 10 changes from the first shape K1 to the third shape K3 that does not overlap the first shape K1 according to a position of the flow path 10 in the Z direction has been shown in the aforementioned embodiment, the present invention is not restricted to this. In the present invention, the position and shape of the flow path 10 may vary within a range that overlaps the cross-sectional shape of the inlet of the flow path, for example, as viewed in the Z direction.

While the example in which the positions of the flow paths 10 in the cross-section CS change spirally from the first ends to the second ends of the flow paths 10 has been shown in the aforementioned embodiment, the present invention is not restricted to this. In the present invention, the positional change is not limited to the spiral positional change, but the positions of the flow paths 10 may change in any manner. For example, with reference to FIG. 7, the positions of the flow paths in the unit structure 30 may be simply switched on the right and left sides of FIG. 7. That is, after the right and left flow paths in the figure are switched in position in the cross-sections CS1 to CS4, the right and left flow paths in the figure may simply return to their original positions due to changes opposite to changes in the cross-sections CS1 to CS4.

While the example in which when the positions of the plurality of flow paths 10 vary in the cross-section CS between the first ends to the second ends of the flow paths 10 in the Z direction such that the adjacent flow paths 10 are switched to other flow paths has been shown in the aforementioned embodiment, the present invention is not restricted to this. In the present invention, each of the flow paths 10 may continue to be adjacent to the same flow paths while the positions of the flow paths 10 in the cross section CS vary continuously between the first ends to the second ends of the flow paths 10 in the Z direction.

While the example in which the plurality of flow paths 10 include the first flow paths 11 through which the first fluid 3 flows and the second flow paths 12 through which the second fluid 4 flows has been shown in the aforementioned embodiment, the present invention is not restricted to this. In the present invention, the plurality of flow paths 10 may further include a third flow path(s) through which a third fluid flows in addition to the first flow paths 11 and the second flow paths 12. The plurality of flow paths 10 may be configured to allow any number of fluids to flow therethrough, and may include the number of flow paths corresponding to the number of fluids.

DESCRIPTION OF REFERENCE NUMERALS

3: first fluid
4: second fluid
10, 10r, 10s: flow path
11, 11p: first flow path
12, 12q : second flow path
20, 20a, 20b : partition wall
22: partition wall
30, 30A, 30B, 30C, 30D, 30E, 30F, 130: unit structure
100: heat exchanger
CS (CS0 to CS16, CS20 to CS24, CS30, CS31, CS40 to CS42, CS50 to CS62): cross-section
K1: first shape
K2: second shape
K3: third shape
Z: direction (predetermined direction)

The invention claimed is:

1. A heat exchanger comprising:
a plurality of flow paths each having a tubular shape, the plurality of flow paths including a plurality of first flow paths configured to allow a first fluid to flow therethrough and a plurality of second flow paths configured to allow a second fluid that exchanges heat with the first fluid to flow therethrough; wherein
the plurality of flow paths extend in a predetermined direction as a whole;
a position and an outer shape of each of the plurality of flow paths in a cross-section orthogonal to the predetermined direction vary according to a position of the each of the plurality of flow paths in the predetermined direction, and
the position and the outer shape of the both of the plurality of the first flow paths and the plurality of the second flow paths vary due to variations in a position and an orientation by rotation of a partition wall configured to separate between the plurality of the first flow paths and the plurality of the second flow paths in the cross-section.

2. The heat exchanger according to claim 1, wherein
the plurality of flow paths are arranged in a grid pattern in a direction orthogonal to the predetermined direction such that each of the plurality of first flow paths and each of the plurality of second flow paths are alternately arranged; and
the position and the outer shape of the each of the plurality of flow paths vary while a state in which the each of the plurality of first flow paths and the each of the plurality of second flow paths are adjacent to each other via a partition wall is maintained.

3. The heat exchanger according to claim 1, wherein
the each of the plurality of flow paths has a first shape in the cross-section that passes through a first position in the predetermined direction;
the outer shape of the each of the plurality of flow paths changes to a second shape that partially overlaps the first shape as viewed in the predetermined direction in the cross-section that passes through a second position in the predetermined direction; and the outer shape of the each of the plurality of flow paths changes to a third shape that partially overlaps the second shape and does not overlap the first shape as viewed in the predetermined direction in the cross-section that passes through a third position in the predetermined direction.

4. The heat exchanger according to claim 1, wherein the position and the outer shape of the each of the plurality of flow paths in the cross-section periodically vary such that the position of the each of the plurality of flow paths in the cross-section varies according to the position of the each of the plurality of flow paths in the predetermined direction between a first end to a second end of the each of the plurality of flow paths, and then the each of the plurality of flow paths returns to an original position thereof.

5. The heat exchanger according to claim 4, wherein the position of the each of the plurality of flow paths in the cross-section changes spirally between the first end to the second end of the each of the plurality of flow paths.

6. The heat exchanger according to claim 1, wherein
the plurality of flow paths form a plurality of unit structures including the plurality of first flow paths and the plurality of second flow paths; and
positions and outer shapes of the plurality of first flow paths and the plurality of second flow paths included in each of the plurality of unit structures vary in conjunction with variations in a position and an orientation of a partition wall between the plurality of flow paths in each of the plurality of unit structures.

7. The heat exchanger according to claim 1, wherein the position of the each of the plurality of flow paths in the cross-section varies between a first end to a second end of the each of the plurality of flow paths in the predetermined direction such that a positioning of adjacent flow paths are switched.

8. The heat exchanger according to claim 7, wherein the positioning of the adjacent flow paths are switched between the first end to the second end of the each of the plurality of flow paths in the predetermined direction such that each of the plurality of first flow paths is adjacent to more different second flow paths than can be concurrently adjacent in any of cross-sections orthogonal to the predetermined direction.

* * * * *